(No Model.)
D. H. CHURCH.
FLUID CONTROLLED CLUTCH MECHANISM.
No. 555,036. Patented Feb. 18, 1896.
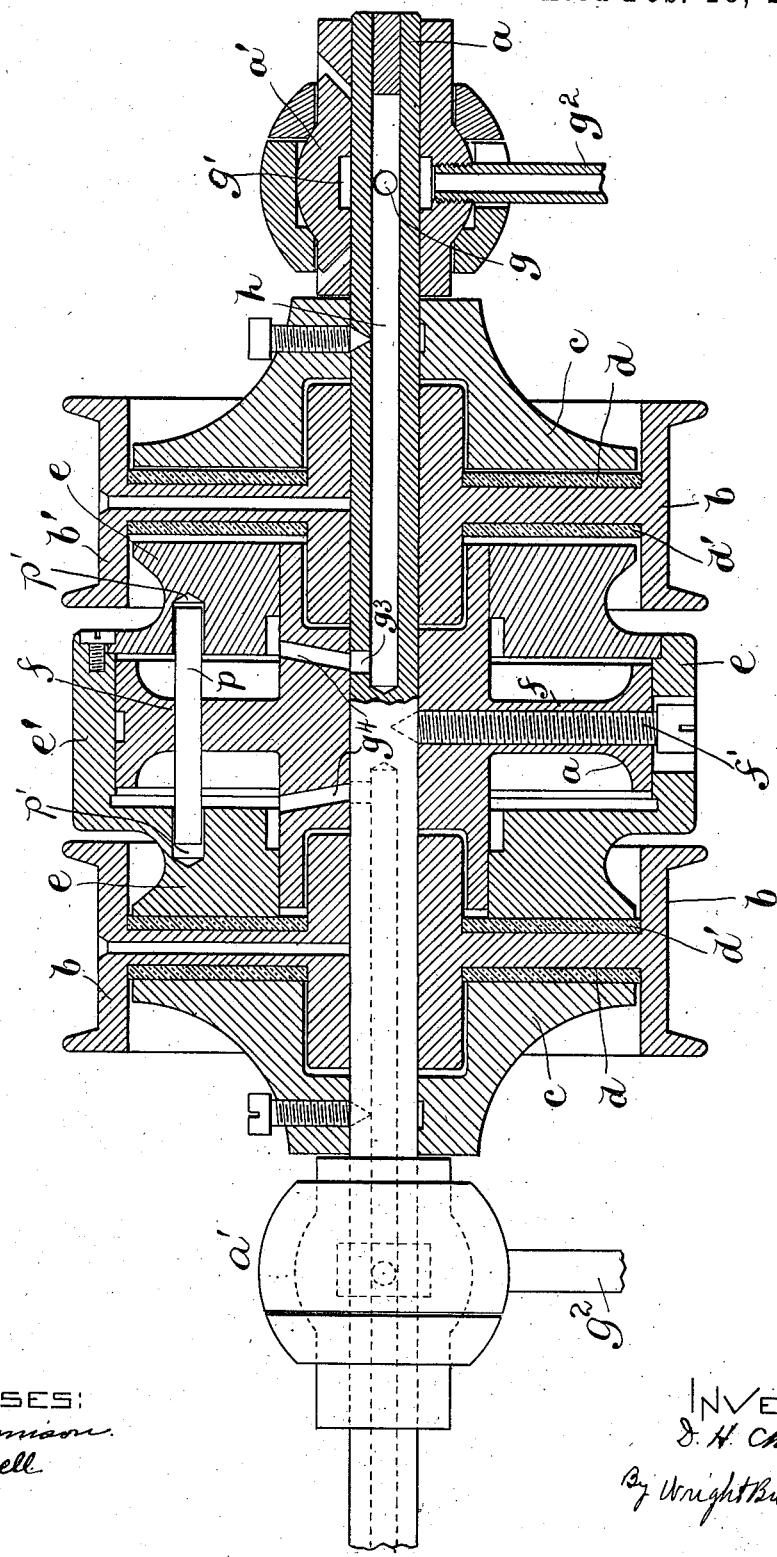
WITNESSES:
A. D. Harrison
W. P. Abell
INVENTOR:
D. H. Church
By Wright Brown & Quimby
Attys

UNITED STATES PATENT OFFICE.

DUANE H. CHURCH, OF NEWTON, MASSACHUSETTS.

FLUID-CONTROLLED CLUTCH MECHANISM.

SPECIFICATION forming part of Letters Patent No. 555,036, dated February 18, 1896.

Application filed July 20, 1895. Serial No. 556,560. (No model.)

*To all whom it may concern:*

Be it known that I, DUANE H. CHURCH, of Newton, in the county of Middlesex and State of Massachusetts, have invented certain new and useful Improvements in Fluid-Controlled Clutch Mechanism, of which the following is a specification.

My present invention relates to clutch mechanism operated through the agency of fluid under pressure, and the object is to provide a practical way of employing fluid to ship a counter-shaft from one speed to another or from one direction of rotation to another.

In carrying out my invention I employ in connection with a driving and a driven machine element, as a pulley and shaft, a clutch-piece rotatively engaged with one element and movable into and out of rotative engagement with the other element, a barrier in juxtarelation to said clutch-piece and immovable toward or from the same, and suitable means for admitting fluid under pressure between the barrier and the clutch-piece, whereby such fluid may exert itself to move the latter into a position of rotative engagement with both driving and driven elements.

The drawing which accompanies and forms part of this specification illustrates an embodiment of the invention, said drawing showing a longitudinal section of a counter-shaft, pulleys, and clutch devices.

In the drawing the letter $a$ designates a counter-shaft which is to be variously driven from a main shaft through the clutch devices presently to be described, and which is journaled in bearings $a'$. Two pulleys $b$ and $b'$ are mounted loosely on the shaft, and they are driven from the main shaft through suitable connections, (not shown,) and one may be driven at one speed and the other at another speed, or one may be driven in one direction and the other in the opposite direction, and of course these conditions may both exist. The web of each pulley is covered on each side with frictional material, preferably in the form of leather washers $d$, and the shaft carries affixed to it on the outer side of each pulley a collar $c$, which constitutes a backing for the pulley to come against and form frictional rotative engagement with when the clutch is operated to produce rotative engagement between that pulley and the shaft.

Between the two pulleys there is a longitudinally-movable clutch-piece in the form of a cylinder composed of heads $e$ and an annular flange $e'$ on one head and fastened by screws to the other. As already intimated, this cylinder is movable longitudinally of the shaft, and such longitudinal movement throws either one head or the other into engagement with one pulley or the other, or, of course, the cylinder may occupy an intermediate position where it engages neither pulley. There is inclosed within the said cylinder a disk $f$, which I term a "barrier" because it acts as such for fluid entering the cylinder to shift the same. The said disk is in the form of a piston closely fitting the cylinder-wall $e'$ and secured to the shaft by a set-screw $f'$. The disk or piston is moreover rotatively engaged with the cylinder by means of a pin $p$, which passes through the web of the piston and enters holes $p'$ in the cylinder-heads, said holes being of sufficient depth to allow for the longitudinal movement of the cylinder. Thus it will be seen that the cylinder remains always rotatively engaged with the piston, and hence with the shaft, (said piston being fast on the shaft), and yet the longitudinal movement in said cylinder requisite to clutch and unclutch is provided for. Now it will be apparent that fluid entering under pressure into the cylinder on one side of the piston will, by acting against the cylinder-head on that side of the piston, move the cylinder and bring it to bear against the pulley on that same side of the piston.

Provision is made for admission of fluid as follows: The shaft $a$ is made hollow from the bearings $a'$ nearly to the center, a solid part being left to separate the passages $h$ thus formed. These passages at the outer end communicate by ports $g$ in the shaft with annular chambers $g'$ in the bearings, said annular chambers communicating with fluid-supply pipes $g^2$. At their inner ends the said passages $g$ communicate through ports $g^3$ in the shaft with passages $g^4$, which extend radially through the hub of the piston and open into the cylinder on opposite sides of the piston.

The operation will now be obvious. In the position of parts shown in the drawings fluid has been admitted to the cylinder on the lefthand side of the piston, and, the piston acting as a barrier, said fluid has exerted its pressure against the cylinder-head and produced a frictional engagement between the same and the pulley $b$ and also between the latter and the collar $c$. Said pulley $b$ is thus connected with the shaft so as to drive the same. By releasing this clutching-charge of fluid and admitting a charge to the cylinder on the opposite side of the piston the other pulley, $b'$, will be rotatively connected with the shaft.

A great advantage of this form of clutch is that the agency employed to operate it—namely, fluid under pressure—has no fixed limit of action, and hence the clutch is not impaired by the wearing away of the frictional surfaces, provided sufficient longitudinal movement in the clutch-cylinder is provided for. Thus frequent adjustment to compensate for wear, as in other forms of clutches, is avoided.

I do not confine myself to the particular form of means here shown for embodying my invention, for it may be carried out in other ways.

It will be observed that by having a single cylinder carrying both clutch-heads $e$ a charge of fluid entering on one side of the piston not only forces one clutch-head against one pulley but simultaneously effects a positive withdrawal of the other clutch-head from the other pulley.

What I claim as my invention is as follows:

The combination with a shaft, a pair of pulleys thereon, and means for resisting movement of said pulleys longitudinally of the shaft; of a single closed cylinder embracing the shaft between the pulleys, a piston in the cylinder, and channels for admission of fluid under pressure into the cylinder on either side of said piston, one of said last-mentioned parts being held from longitudinal movement and the other constituting a one-piece double-faced clutch member to engage the pulleys under longitudinal movement,— the admission of fluid on one or the other side of the piston effecting a clutching of one pulley and at the same time a positive unclutching of the other pulley.

In testimony whereof I have signed my name to this specification, in the presence of two subscribing witnesses, this 5th day of July, A. D. 1895.

DUANE H. CHURCH.

Witnesses:
A. D. HARRISON,
W. P. ABELL.